C. W. STERICK.
Steam-Cooking Apparatus.

No. 129,613.   Patented July 16, 1872.

Witnesses:
Henry N. Miller
C. L. Evert

Inventor.
Chas. W. Sterick,
per Alexander Mason
Attorneys.

UNITED STATES PATENT OFFICE.

CHARLES WESLEY STERICK, OF MECHANICSBURG, PENNSYLVANIA.

IMPROVEMENT IN STEAM COOKING APPARATUS.

Specification forming part of Letters Patent No. 129,613, dated July 16, 1872.

*To all whom it may concern:*

Be it known that I, CHAS. W. STERICK, of Mechanicsburg, in the county of Cumberland and in the State of Pennsylvania, have invented certain new and useful Improvements in Steam Cooking Apparatus; and do hereby declare that the following is a full, clear, and exact description thereof, reference being had to the accompanying drawing and to the letters of reference marked thereon making a part of this specification.

The nature of my invention consists in the construction and arrangement of a boiler for cooking several articles of food at one time by steam without mixing the flavors, substantially as hereinafter more fully set forth.

In order to enable others skilled in the art to which my invention appertains to make and use the same, I will now proceed to describe its construction and operation, referring to the annexed drawing, in which—

Figure 1:
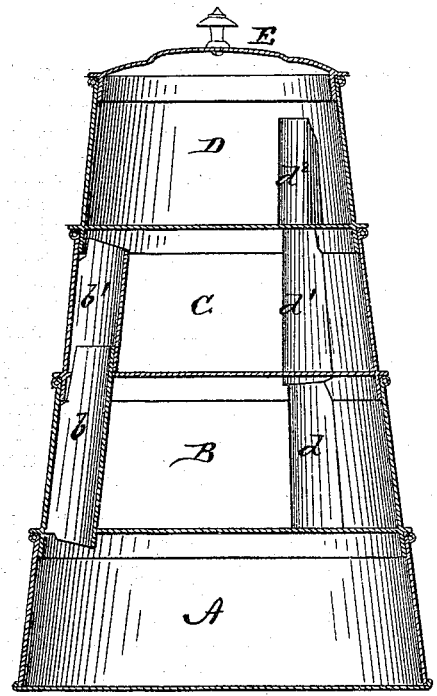
Figure 2:
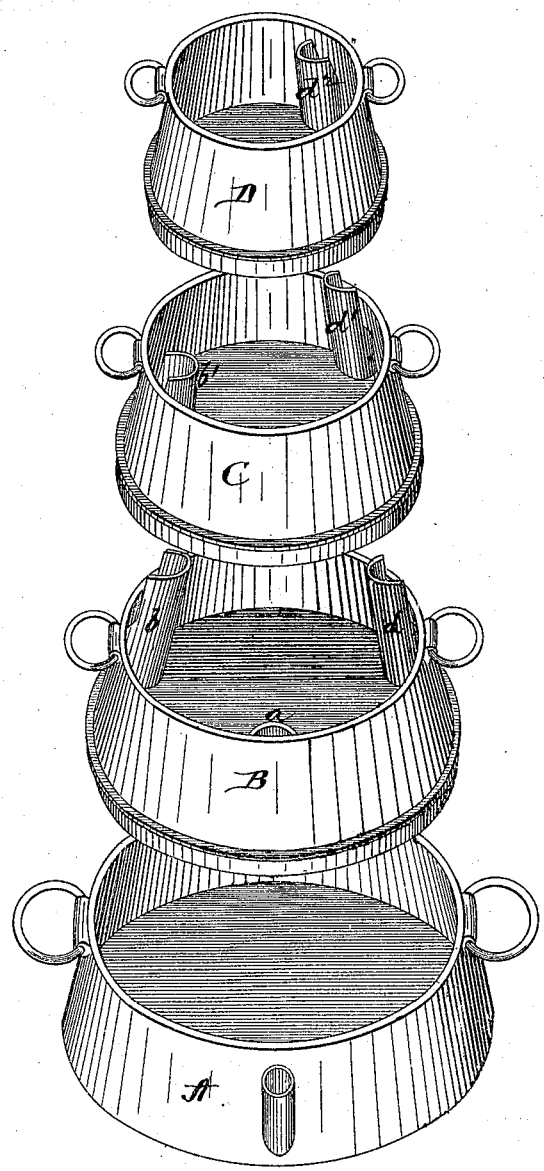

Figure 1 is a vertical section of my boiler, and Fig. 2 is a perspective view of the same with the various sections separated.

My boiler is composed of any desired number of sections, A, B, C, and D, placed on top of each other, and made of any suitable shape, though I prefer to make them tapering, so as to diminish in size from the bottom to the top. The lower section A is intended to contain water, and the other sections the victuals to be cooked. The second section B has three steam chambers or tubes, $a$, $b$, and $d$, to let the steam through. The third section C covers two of these openings or tubes, $b$ and $d$, and lets the steam from the tube $a$ pass into the second section B. The third section C has two steam tubes or passages, $b'$ and $d^1$, communicating with the tubes $b$ and $d$ of the second section. The fourth section D has one steam tube, $d^2$, communicating with the tube $d^1$ of the third section, and allows the steam to pass through the tube $b\ b'$ into the third section C. E is a lid covering the fourth section, allowing the steam through the tube $d\ d^1\ d^2$ to pass into the top section. Thus it will be seen there are as many steam-tubes as there are sections for victuals, one tube terminating and opening into each of said sections. Each section gets its own proportionate amount of steam, and the chambers, channels, or tubes in which the steam passes go direct in each section from the water-boiler or lower section A, leaving no possible chance for the flavors to mix by steam passing from one section to another. Making the lower sections larger than the top ones prevents them from tipping over or upsetting easy. The sections being of different sizes makes it more convenient for cooking, as the victuals that take the longest to cook can be put in the larger sections, and, as they have more steam on account of their being nearer the water-boiler and have only part of the distance to ascend, cook as soon as the victuals in the small boiler or sections at the top.

Having thus fully described my invention, what I claim as new, and desire to secure by Letters Patent, is—

A sectional culinary boiler having a tube passing from the lower section or water-boiler to each of the other sections, so that the steam may pass from said water-boiler direct to each of the other sections without interfering with the other or mixing the flavors, substantially as herein set forth.

In testimony that I claim the foregoing I have hereunto set my hand this 29th day of May, 1872.

CHARLES WESLEY STERICK.

Witnesses:
WM. A. MIDDLETON,
JOSEPH LEAS.